Oct. 24, 1933.   L. COHEN   1,931,814

METHOD FOR INSULATING AND PACKING PIPE CONNECTIONS BY INCLOSURE

Filed Feb. 10, 1932

Inventor
Louis Cohen

Patented Oct. 24, 1933

1,931,814

UNITED STATES PATENT OFFICE 1,931,814

METHOD FOR INSULATING AND PACKING PIPE CONNECTIONS BY INCLOSURE

Louis Cohen, Duisburg, Germany

Application February 10, 1932, Serial No. 592,198, and in Germany February 14, 1931

4 Claims. (Cl. 154—28)

Besides the commonly used packing of pipe connections by painting the sleeves with tar and ramming same with cast lead or lead wool, special metal packing sleeves and caps are known, which surround the joint leaving a hollow space, which is cast full with a tar pitch mixture. These packing sleeves are open to the objection that they are too expensive and require special insulation, as the metal sleeves are subjected to destruction by rust when in the earth. This insulation, if it is to be effective, mostly consists of a jute bandage which, in order to avoid any non-insulated points in the conduit, must extend beyond the insulation of the pipe ends. This special insulation renders the known packing sleeve uneconomical.

The method according to the invention relates to a packing and insulation of pipe connections which overcomes the above mentioned objections in a simple manner, in that a plate molded from the outer development of the pipe connection, made of bituminous mass or other packing and insulating material, is placed as sleeve around the pipe connection, the sleeve being reinforced by a lead, cardboard or other suitable insert. The elastic sleeve overlaps the pipe ends beyond the insulation of the same, so that no non-insulated points exist along the entire pipe line. The end edges of the plate of elastic material wrapped around the pipe are united by heat to form a sleeve and the ends of this sleeve are also united with the pipe by heat. As the packing sleeve consists of insulating material, a separate insulation of the pipe connection is unnecessary.

An embodiment of the invention is illustrated by way of example in the accompanying drawing in which:—

Figures 1, 2:
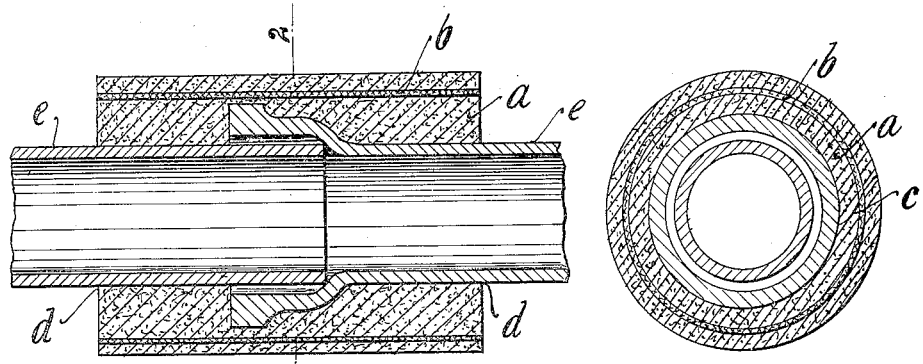
Fig. 1 shows in longitudinal section a pipe connection fitted with the inclosure according to the invention.
Fig. 2 is a cross section on line 2—2 of Fig. 1.
Figure 3:
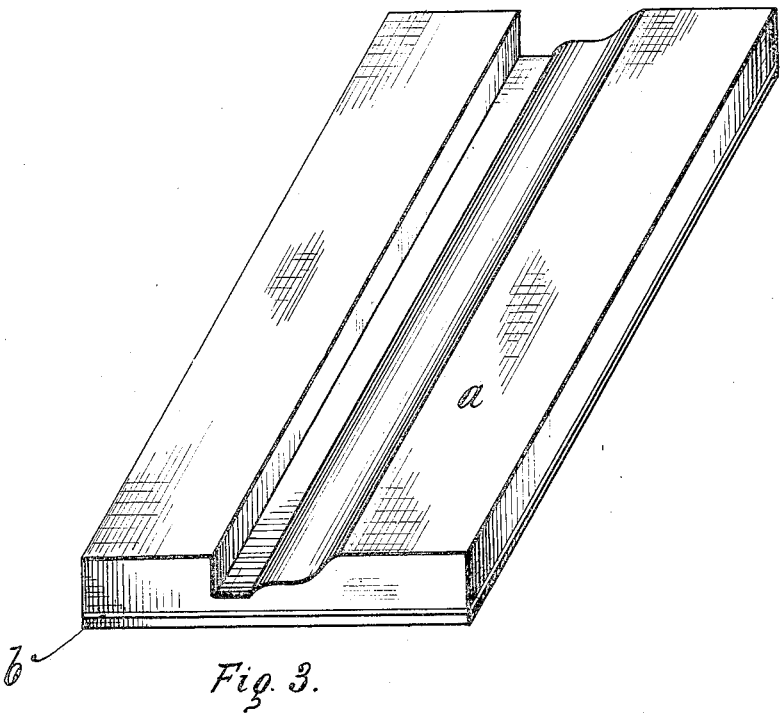
Fig. 3 is a perspective view of the packing and insulating plate.

An elastic plate $a$, shaped corresponding to the outer development of the pipe connection, consisting of bituminous mass or similar material, is placed to form a sleeve around the pipe connection (Fig. 1), and its ends are tightly united by heat at the point $c$. At the points $d$ the sleeve is also rigidly connected by heat to the pipe ends. The sleeve $a$ projects on each end over the pipe insulation $e$, so that the entire pipe line has no non-insulated points. The joint $c$ may be a butt or overlap connection. The lead insert $b$ is intended for reinforcing and packing the sleeve so that, in the case of gas pipes, gas leaking through the pipe connection cannot escape.

I claim:—

1. A method for insulating and packing pipe connections by inclosure, consisting in shaping a plate of elastic packing and insulating material corresponding to the development of the pipe connection, in providing said plate with a reinforcement and packing, in placing said plate around the pipe connection so that it forms a sleeve, in uniting by heat the abutting edges of said plate, in uniting each end of said sleeve by heat to one pipe of the pipe connection, said sleeve completely enclosing the pipe joint, and projecting on both sides over the insulation of the pipes.

2. In a method as specified in claim 1 the employment of an elastic plate made of bituminous mass.

3. In a method as specified in claim 1 the employment of lead as reinforcing and packing material.

4. In a method as specified in claim 1 the employment of cardboard as reinforcing and packing material.

LOUIS COHEN.